US008643859B2

(12) United States Patent
Song et al.

(10) Patent No.: US 8,643,859 B2

(45) Date of Patent: Feb. 4, 2014

(54) IMAGE FORMING APPARATUS AND CONTROL METHOD THEREOF

(75) Inventors: Hyun-soo Song, Suwon-si (KR); Suk-goo Kim, Namyangju-si (KR); Guk-hwan Lee, Chilgok-gun (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 267 days.

(21) Appl. No.: 13/064,673

(22) Filed: Apr. 7, 2011

(65) Prior Publication Data

US 2012/0081727 A1 Apr. 5, 2012

(30) Foreign Application Priority Data

Sep. 30, 2010 (KR) ........................ 10-2010-0094958

(51) Int. Cl.

| | |
|---|---|
| ***G06F 3/12*** | (2006.01) |
| ***G06K 15/00*** | (2006.01) |
| ***H04N 1/60*** | (2006.01) |
| ***H04N 1/40*** | (2006.01) |
| ***B65H 39/00*** | (2006.01) |

(52) U.S. Cl.

USPC ........... 358/1.13; 358/1.14; 358/1.9; 358/2.1; 270/58.07

(58) Field of Classification Search

USPC ........ 358/1.13, 1.14, 1.9, 2.1; 270/278, 58.07

See application file for complete search history.

(56) References Cited

U.S. PATENT DOCUMENTS

| | | | | |
|---|---|---|---|---|
| 2005/0185222 | A1 * | 8/2005 | Sammis et al. | 358/2.1 |
| 2009/0051959 | A1 * | 2/2009 | Matsui et al. | 358/1.14 |
| 2010/0194020 | A1 * | 8/2010 | Iguchi | 270/58.07 |

FOREIGN PATENT DOCUMENTS

| | | |
|---|---|---|
| GB | 2275851 | 9/1994 |
| JP | 1996-098158 | 4/1996 |

* cited by examiner

*Primary Examiner* — Miya J Cato

*Assistant Examiner* — Temitayo Folayan

(74) *Attorney, Agent, or Firm* — Staas & Halsey LLP

(57) ABSTRACT

An image forming apparatus and a control method thereof which performs an auto-recovery function, the image forming apparatus including: a housing including a door; an image forming unit mounted in the housing to form an image on a print medium; a medium discharger which discharges the print medium to an outside of the housing; a finisher mounted on the housing to perform a finishing operation; a discharging direction changer which changes a discharging direction of the print medium to guide the print medium to one of the medium discharger and the finisher; and a controller which controls the image forming unit, the finisher and the discharging direction changer, and selectively performs an auto-recovery operation to automatically recover a jam of the print medium depending upon an occurrence location of the jam of the print medium if the jam occurs from a predetermined location of a print medium feeding path.

11 Claims, 4 Drawing Sheets

IMAGE FORMING APPARATUS AND CONTROL METHOD THEREOF

CROSS-REFERENCE TO RELATED APPLICATIONS

This application claims priority from Korean Patent Application No. 10-2010-0094958, filed on Sep. 30, 2010 in the Korean Intellectual Property Office, the disclosure of which is incorporated herein by reference.

BACKGROUND

1. Field

Apparatuses and methods consistent with the exemplary embodiments relate to an image forming apparatus and a control method thereof, and more particularly, to an image forming apparatus and a control method thereof which performs an auto-recovery function by mounting a finisher.

2. Description of the Related Art

Generally, an image forming apparatus is a device which prints an image on a print medium according to an input image signal, and may be classified into an inkjet type, a thermal transfer type and an electrophotographic type according to its print type.

The image forming apparatus has a rising demand as a printer printing a document but also as a multi-function peripheral performing scanning and fax functions. An image forming apparatus which is equipped with high performance is being developed to extend its inherent functions.

Accordingly, the image forming apparatus may include a finisher to perform a finishing operation to a print medium on which an image is formed. The finisher sorts, groups, staples, binds, folds and punches the print medium on which an image is formed.

While the image forming apparatus forms an image on a print medium, a jam of the print medium may occur due to various causes on a print medium feeding path. In addition to notifying a location of the jam, an auto-recovery is known as a measure to remove the jam.

The auto-recovery automatically discharges the print medium located on the print medium feeding path by opening or closing a door of a housing of the image forming apparatus or by manipulating an additional manipulation key.

If the image forming apparatus which includes the finisher employs the auto-recovery, the following may arise as a result of the jam of the print medium:

A feeding movement of the print medium is suspended due to the jam within the image forming apparatus since another print medium is not discharged and remains in the finisher. In this case, an actuator in the finisher does not operate due to the print medium located within the finisher.

If the auto-recovery is performed under the foregoing circumstances, the jammed print medium starts to be discharged along the feeding path. The discharged print medium collides with another jammed print medium within the finisher to thereby cause another jam or damage to the image forming apparatus.

SUMMARY

Accordingly, one or more exemplary embodiments provide an image forming apparatus and a control method thereof which includes a finisher to selectively perform an auto-recovery operation to a jam of a print medium and efficiently responds to the jam.

The foregoing and/or other aspects may be achieved by providing an image forming apparatus including: a housing which includes a door; an image forming unit which is mounted in the housing and forms an image on a print medium; a medium discharger which discharges the print medium, on which the image is formed, to an outside of the housing; a finisher which is mounted in a location of the housing and performs a finishing operation including at least one of sorting, grouping, stapling, binding and punching operations with respect to the print medium on which the image is formed; a discharging direction changer which changes a discharging direction of the print medium to guide the print medium discharged from the image forming unit to one of the medium discharger and the finisher; and a controller which controls the image forming unit, the finisher and the discharging direction changer, and selectively performs an auto-recovery operation to automatically recover a jam of the print medium depending upon an occurrence location of the jam of the print medium if the jam occurs from a predetermined location of a print medium feeding path.

The controller may control the auto-recovery operation not to be performed if the jam of the print medium occurs when the print medium is located in the discharging direction changer.

The controller may control the auto-recovery operation to be performed under a predetermined condition if the jam of the print medium occurs when the print medium is not located in the discharging direction changer.

The predetermined condition may include one of a manipulation of a user input key provided additionally and an opening or closing of the door of the housing.

The controller may control the discharging direction changer to discharge a print medium following the jammed print medium on the print medium feeding path to the medium discharger when the auto-recovery operation is performed.

The controller may control the image forming unit to form an image on a print medium following the jammed print medium after the print medium located on the print medium feeding path is discharged to the medium discharger, and may control the discharging direction changer to discharge the print medium on which the image is formed to the finisher if the jam occurs when the print medium is not located in the discharging direction changer during the process of discharging the print medium to the finisher.

The image forming apparatus may further include a first medium detector which is provided in a print medium discharging path within the housing, and a second medium detector which is provided in the finisher, and the controller may determine an occurrence of the jam and an occurrence location of the jam based on an on/off of the first and second medium detectors.

The foregoing and/or other aspect may be achieved by providing a control method of an image forming apparatus which includes an image forming unit forming an image on a print medium, a medium discharger discharging the print medium on which the image is formed, a finisher performing a finishing function including at least one of sorting, grouping, stapling, binding and punching operations with respect to the print medium on which the image is formed, and a discharging direction changer which changes a discharging direction of the print medium to guide the print medium discharged from the image forming unit to one of the medium discharger and the finisher, the control method including: detecting an occurrence of a jam of a print medium in a predetermined location on a print medium feeding path; and controlling an auto-recovery operation to be performed selectively to automatically recover the jam of the print medium depending upon the occurrence location of the jam when such jam occurs.

The controlling may include controlling not to perform the auto-recovery operation if the jam of the print medium occurs when the print medium is located in the discharging direction changer.

The controlling may include controlling the auto-recovery operation to be performed under a predetermined condition if the jam of the print medium occurs when the print medium is not located in the discharging direction changer.

The predetermined condition may include one of a manipulation of a user input key provided additionally and an opening or closing of the door of a housing accommodating the image forming unit therein.

The controlling may include controlling the discharging direction changer to discharge a print medium following the jammed print medium on the print medium feeding path when the auto-recovery operation is performed.

The controlling may include controlling the image forming unit to form an image on a print medium following the jammed print medium after the print medium located on the print medium feeding path is discharged to the medium discharger, and controlling the discharging direction changer to discharge the print medium, on which the image is formed, to the finisher if the jam occurs when the print medium is not located in the discharging direction changer during the process of discharging the print medium to the finisher.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Figure 1:
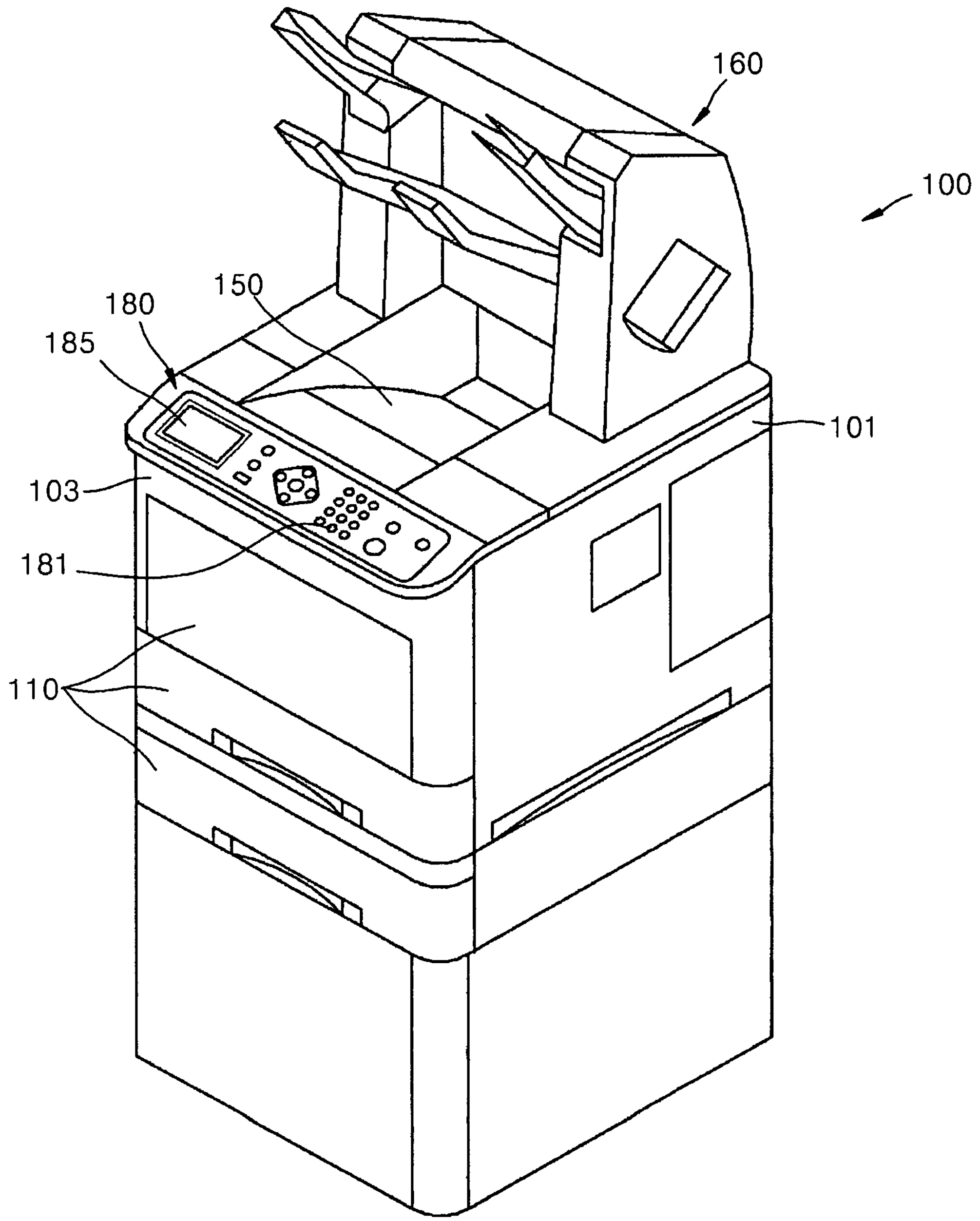
FIG. 1 is a schematic perspective view of an image forming apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 2:
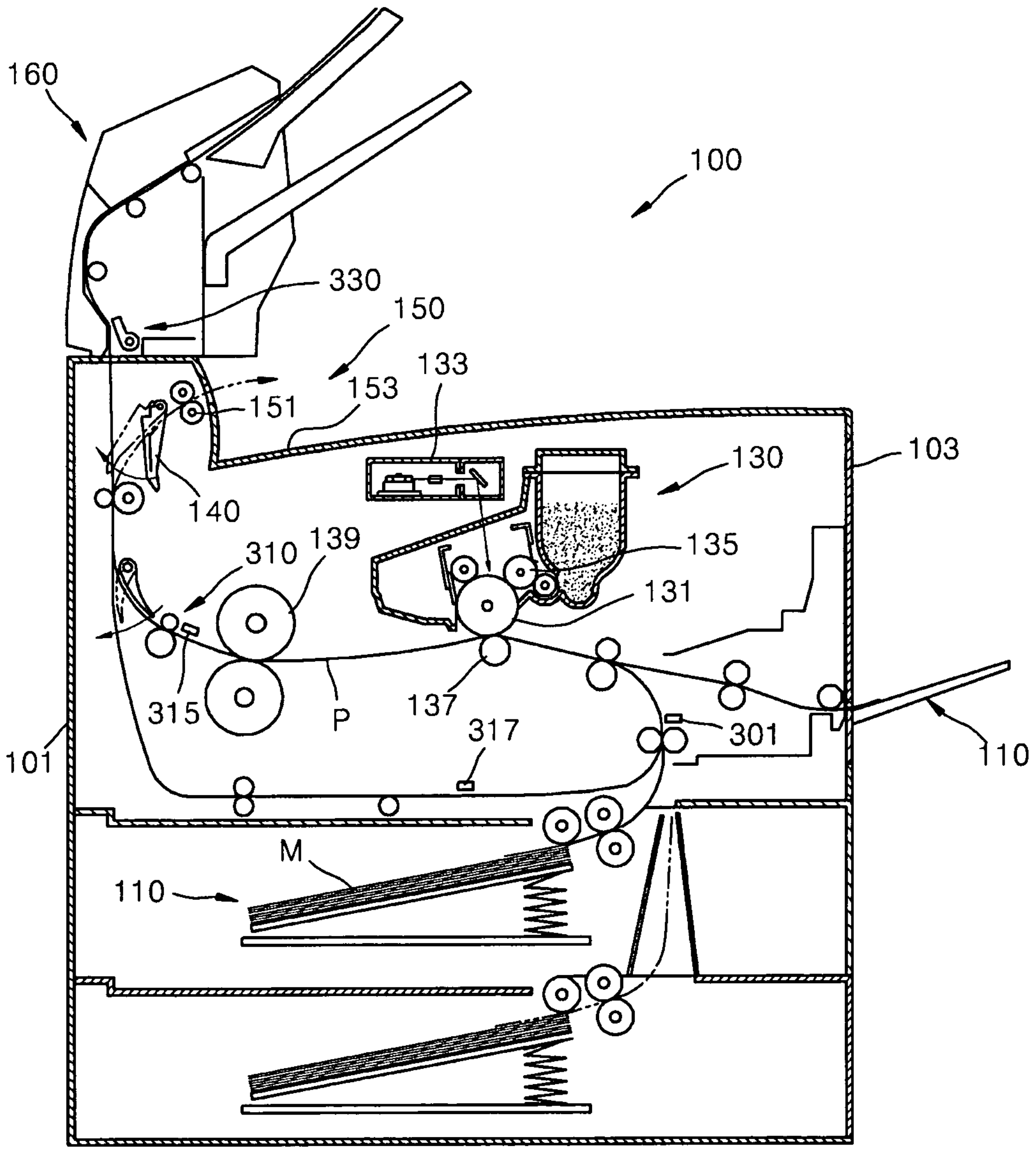
FIG. 2 is a schematic sectional view of the image forming apparatus according to an exemplary embodiment.
Figure 3:
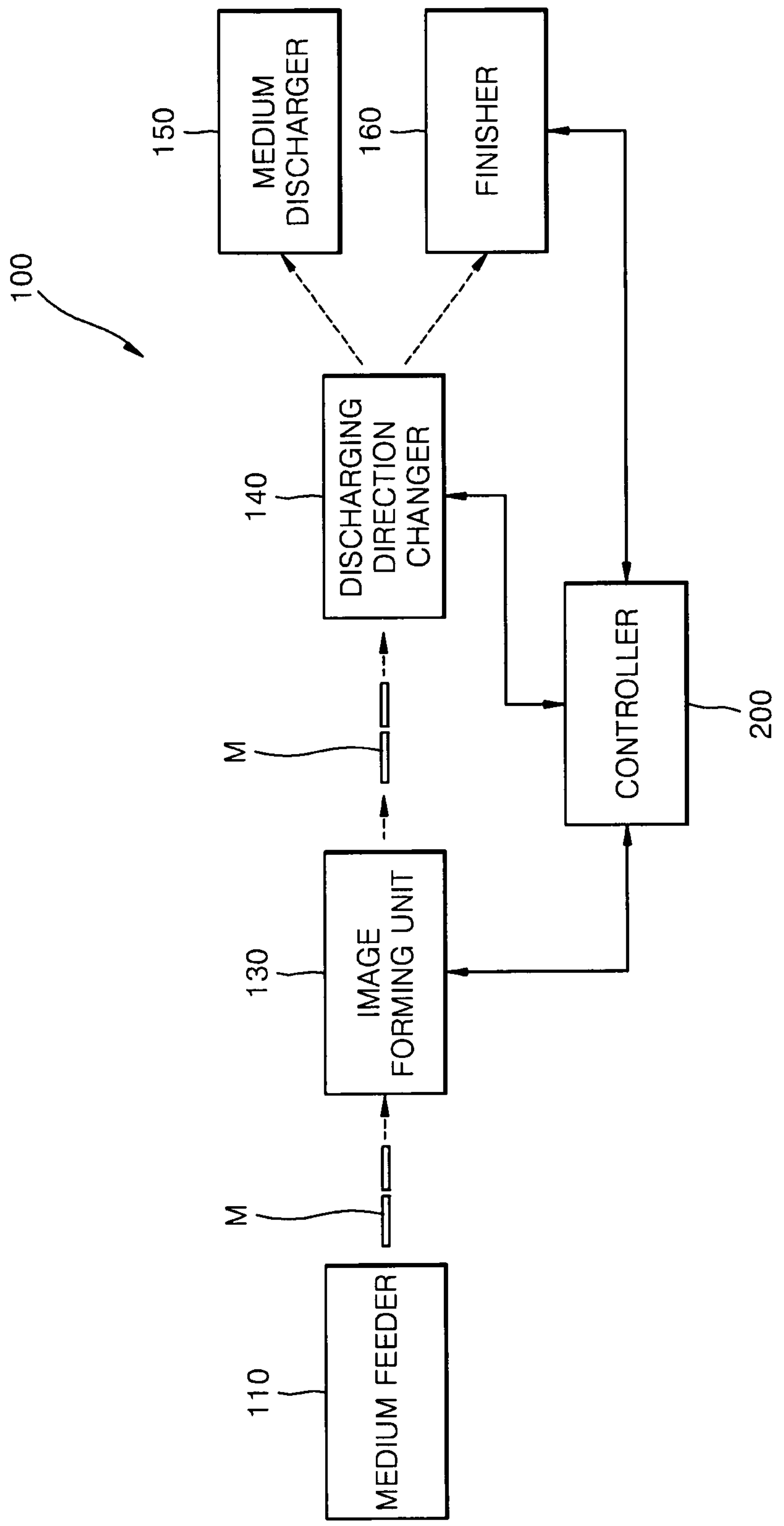
FIG. 3 is a block diagram of the image forming apparatus according to an exemplary embodiment.

FIG. 1 is a schematic perspective view of an image forming apparatus according to an exemplary embodiment. FIG. 2 is a schematic sectional view of the image forming apparatus according to an exemplary embodiment. FIG. 3 is a block diagram to describe a control process of the image forming apparatus according to an exemplary embodiment.

Referring to the drawings, an image forming apparatus 100 according to an exemplary embodiment includes a housing 101 including a door 103, an image forming unit 130, a medium discharger 150, a finisher 160, a discharging direction changer 140 and a controller 200.

The image forming unit 130 is mounted in the housing 101, and forms an image on a print medium fed by a medium feeder 110. FIG. 2 illustrates the image forming unit 130 which forms a mono image by an electrophotographic method. Referring to FIG. 2, the image forming unit 130 includes an image carrier 131, a light scan unit (LSU) 133 which scans a laser beam to the image carrier 131 and forms a latent image thereon, a developing unit 135 which develops a toner image with respect to the latent image, a transfer unit 137 which transfers the image from the image carrier 131 to a print medium M fed along a print medium feeding path P, and a fusing unit 139 which fuses the image transferred to the print medium M.

In the present exemplary embodiment, the image forming unit 130 forms a mono image on a print medium by an electrophotographic method, but is not limited thereto. Alternatively, the image forming unit 130 may form an image by an inkjet or thermal transfer method. Further, the image forming unit 130 may form a color image.

The medium discharger 150 discharges the print medium M, on which the image is formed by the image forming unit 130, to an outside of the housing 101, and loads the discharged print medium M. To do the foregoing operation, the medium discharger 150 includes a discharging roller 151, and a tray 153 on which the print medium M discharged to the outside of the housing 101 is loaded.

The finisher 160 is a kind of an optional device, and is mounted in a predetermined location of the housing 101. The finisher 150 performs a finishing operation such as sorting, grouping, stapling, binding and punching operations with respect to the print medium M on which the image is formed. The finisher 160 may be connected to a main body of the image forming apparatus 100 through a universal serial bus (USB) or a communication interface channel such as a universal asynchronous receiver transmitter (UART).

In the present exemplary embodiment, the finisher 160 is detachably mounted in the housing 101 of the image forming apparatus 100, but not limited thereto. Alternatively, the finisher 160 may be integrally formed in the image forming apparatus 100.

The discharging direction changer 140 is movably mounted between a first location expressed in a solid line and a second location expressed in a dotted line on the print medium feeding path P between the image forming unit 130, and the medium discharger 150 and the finisher 160. The discharging direction changer 140 changes a discharging direction of the print medium M discharged from the image forming unit 130 according to its location, and guides the print medium M to be fed to one of the medium discharger 150 and the finisher 160. That is, when the discharging direction changer 140 is located in the first location, the medium M is guided to the finisher 160. When the discharging direction changer 140 is located in the second direction, the print medium M is guided to the medium discharger 150.

The controller 200 controls overall operations of the image forming apparatus 100 including a driver including a driving source (not shown) and a power transmitter (not shown) of the image forming apparatus 100, the image forming unit 130, the finisher 160, and the discharging direction changer 140. Particularly, the controller 200 selectively performs an auto-recovery operation to remove a jam of a print medium depending on the location of the jam when the jam occurs in a predetermined location of the print medium feeding path P.

The housing 101 may have a user interface 180 therein. The user interface 180 includes an input unit 181 to receive a user's command, and a display unit 185 to display thereon a setting and an operation status of the image forming apparatus 100.

The input unit 181 may include at least one of a user input key provided in the image forming apparatus 100 and a graphic user interface (GUI) generated by an execution of a predetermined application and displayed on the display unit 185 to receive a user's input by a touch.

The image forming apparatus 100 according to the exemplary embodiment may further include first and second medium detectors 310 and 330 to detect whether the print medium M is normally fed along the print medium feeding path P or a jam of a print medium M occurs in a predetermined area. The first medium detector 310 is provided on the print medium feeding path P within the housing 101. The first medium detector 310 may include a feeding detector 301 to detect whether, the print medium M is normally fed on the print medium feeding path P from the medium feeder 110, and a discharging detector 315 to detect whether the print medium M having the image formed thereon is normally discharged from the image forming unit 130. The first medium detector 310 may further include a duplex detector 317 which is provided on a duplex path used to form an image on a duplex of the print medium M and detects the movement of the print medium M.

The second medium detector 330 is provided in the finisher 160 and detects whether the print medium M enters into the inside of the finisher 160.

Hereinafter, a process for handling a jam of the print medium M of the image forming apparatus 100 according to an exemplary embodiment will be described.

On the basis of turn-on or off of the first and second medium detectors 310 and 330, the controller 200 may determine an occurrence/non-occurrence of a jam of a print medium M and a location where the jam occurs. That is, the controller 200 determines whether the print medium M is jammed and the location where the print medium M is jammed, and suspends the image forming process of the image forming apparatus 100 and notifies a user of the foregoing through the display unit 185 or a printer driver in the following four cases that:

(i) the feeding detector 311 is not turned off predetermined time after it is turned on according to the feeding of the print medium M;

(ii) the discharging detector 315 is not turned on predetermined time after the feeding detector 311 is turned on;

(iii) the discharging detector 315 is not turned off predetermined time after it is turned on; or (iv) the second medium detector 330 is not turned on predetermined time after the discharging detector 315 is turned on even though the finishing function is selected.

As the driving for the feeding of the print medium M of the image forming apparatus 100 is resumed under the circumstances where the jam of the print medium M occurs as the above cases, the auto-recovery operation may be performed to automatically discharge the print medium M to the outside of the housing 101. The controller 200 selectively performs the auto-recovery operation depending upon the occurrence location of the jam of the print medium M to thereby prevent another jam or damage to the image forming apparatus 100.

In the case (iv) above, the controller 200 determines that the jam has occurred when the print medium M was located in the discharging direction changer 140. If the auto-recovery operation is performed, the print medium M stuck in the discharging direction changer 140 does not move forward and only a print medium M located in a lower part of the feeding path P moves forward and possibly causes another jam. In consideration of the foregoing, the controller 200 does not perform the auto-recovery operation when the jam occurs while the print medium M is located in the discharging direction changer 140, and notifies a user of the occurrence location of the jam through the display unit 185 or the printer driver. Then, errors in handling the jam or damage to the image forming apparatus 100 which may arise from the performance of the auto-recovery operation may be prevented.

Instead, the jam may be removed by opening the door 103 of the housing 101 and manually removing the print medium M stuck in the discharging direction changer 140. That is, if the jam occurs from another feeding path, the jammed print medium M may be automatically discharged to the outside of the housing 101 by the auto-recovery operation. Then, the removal of the jam in a manual manner is minimized to improve user's convenience.

In the cases (i) to (iii) above, the controller 200 determines that the jam of the print medium M occurred when the print medium M was not located in the discharging direction changer 140. Then, the controller 200 controls a driver of the image forming apparatus 100 to perform the auto-recovery operation under a predetermined condition. The predetermined condition may include opening/closing the door 103 of the housing 101 or a manipulation of the user input key 181 by a user. In performing the auto-recovery operation, the controller 200 controls the discharging direction changer 140 to discharge the print medium located on the print medium feeding path to the medium discharger 150 when the jam occurs. That is, the controller 200 controls the discharging direction changer 140 to be located in the second location to thereby block the print medium M to enter into the finisher 160. Thus, the print medium M which is discharged by the auto-recovery operation is prevented from being mixed with another print medium M which enters into the finisher 160 after undergoing a normal print operation.

While the print medium M is discharged to the finisher 160, the jam may occur when the print medium M is not located in the discharging direction changer 140. The controller 200 performs a normal print operation after the print medium M located on the print medium feeding path P is discharged to the medium discharger 150. That is, the controller 200 controls the image forming unit 130 to form an image on a new print medium M following the jammed print medium M. Further, the controller 200 controls the discharging direction changer 140 to be located in the first location so that the print medium M on which the image is formed is discharged to the finisher 160.

Hereinafter, a control method of the image forming apparatus 100 according to an exemplary embodiment will be described in more detail.

Figure 4:
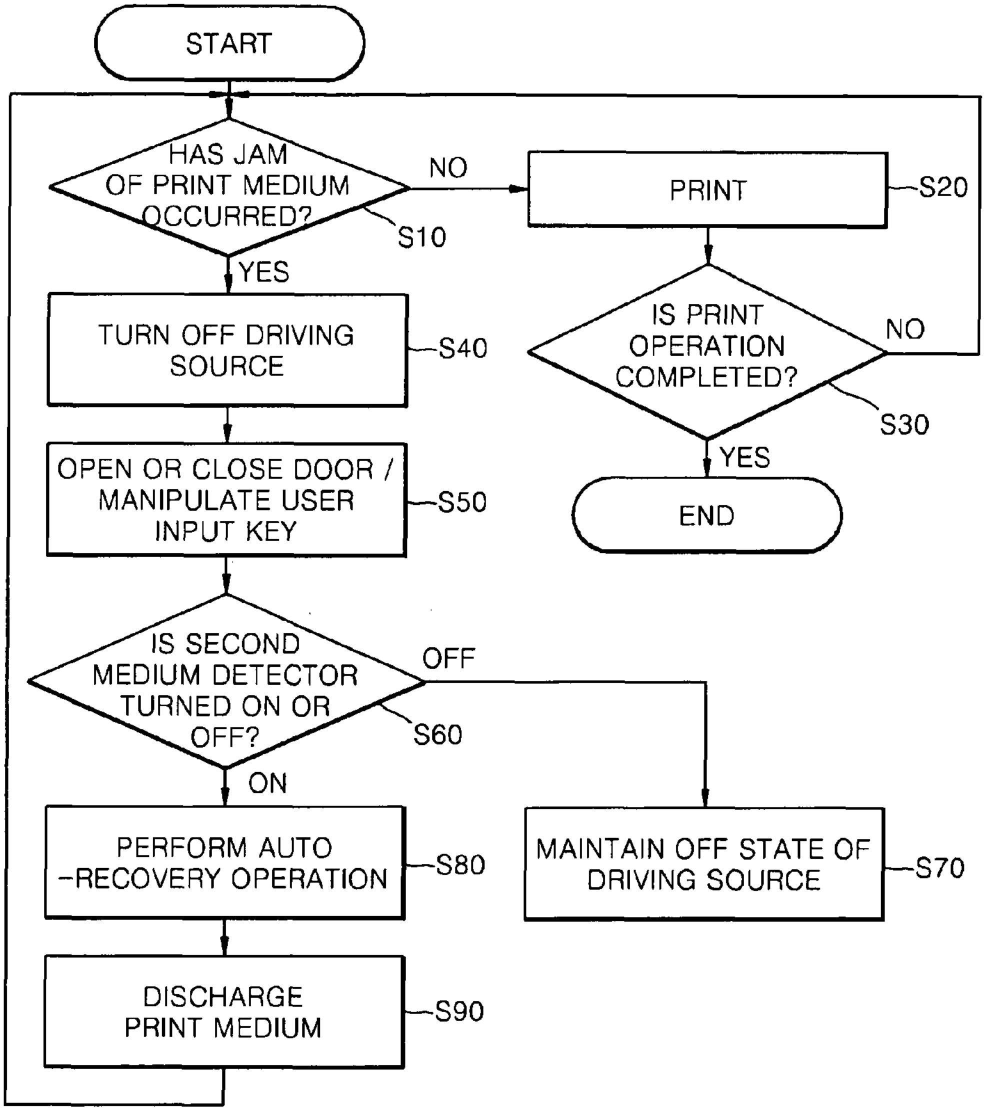
FIG. 4 is a flowchart of a jam removing process by a control method of the image forming apparatus according to an exemplary embodiment.

FIG. 4 is a flowchart of removing the jam of the print medium M by the control method of the image forming apparatus 100 according to the exemplary embodiment.

Referring to FIGS. 1 to 4, the control method of the image forming apparatus 100 according to the exemplary embodiment includes an operation S10 of detecting the occurrence of the jam of the print medium M in the predetermined location of the print medium feeding path P, and an operation of selectively performing the auto-recovery operation depending on the occurrence location of the jam to automatically recover the jam of the print medium if the jam occurs.

The occurrence and the occurrence location of the jam of the print medium M may be detected by the first medium detector 310 installed within the housing 101, and the second medium detector 330 installed within the finisher 160. If it is determined that the jam of the print medium M did not occur, the normal print operation is performed (S20), and the operation S10 is selectively performed depending on whether the print operation is completed (S30) or the print process ends.

At operation S10, if it is determined that the jam of the print medium M occurred, the controller 200 turns off the driving source of the image forming apparatus 100 and suspends the print process until the predetermined condition is satisfied (S40). The predetermined condition may include one of the manipulation of the user input key provided additionally and the opening or closing of the door 103 of the housing 101 accommodating therein the image forming unit 130. If the door 103 is opened or closed or the user input key 181 is manipulated (S50), the controller 200 determines whether the jam occurred while the print medium M was located in the discharging direction changer 140 (S60). That is, if the second medium detector 330 is turned off, the controller 200 determines that the print medium M is jammed in the discharging direction changer 140 and maintains the off state of the driving source not to perform the auto-recovery operation (S70). If the driving source maintains its off state, a message may be indicated through the display unit 185 or the printer driver that the auto-recovery operation may not be performed due to the jam of the print medium M in the discharging direction changer 140. In this case, if a user manually removes the jammed print medium M from the discharging direction changer 140, the process returns to operation S60 and next operations may sequentially be performed.

At operation S60, if it is determined that the second medium detector 330 is turned on, the controller 200 turns on the driving source to perform the auto-recovery operation while the discharging direction changer 140 is located in the second location (S80). Then, the discharging direction changer 140 changes the discharging direction of the print medium M to automatically discharge the print medium M located on the feeding path P toward the medium discharger 150 (S90). Then, the process returns to operation S10 and next operations are performed sequentially.

The order of operations S50 and S60 may be changed with each other. That is, after the jam of the print medium is determined while the print medium M is not located in the discharging direction changer 140, the auto-recovery operation may be performed under the predetermined condition.

With the foregoing configuration, the image forming apparatus 100 which includes the finisher 160 according to the exemplary embodiment selectively performs the auto-recovery operation depending upon the occurrence location of the jam of the print medium M. That is, the auto-recovery operation is not performed in the circumstances where the operation causes malfunction. Thus, errors in the finishing operation, damage to the image forming apparatus 100 or abnormal insertion of the print medium M may be prevented. Also, another jam of the print medium M due to the print medium M located in the entrance of the finisher 160 may be prevented in advance.

As the auto-recovery operation is performed upon the occurrence of the jam of the print medium within the housing of the image forming apparatus while another print medium is not located in the entrance of the finisher, the jammed print medium may be removed automatically.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image forming apparatus comprising:

a housing which comprises a door;

an image forming unit which is mounted in the housing and forms an image on a print medium;

a medium discharger which discharges the print medium, on which the image is formed, to an outside of the housing;

a finisher which is mounted in a location of the housing and performs a finishing operation comprising at least one of sorting, grouping, stapling, binding and punching operations with respect to the print medium on which the image is formed;

a discharging direction changer which changes a discharging direction of the print medium to guide the print medium discharged from the image forming unit to one of the medium discharger and the finisher; and a controller which controls the image forming unit, the finisher and the discharging direction changer, and selectively performs an auto-recovery operation to automatically recover a jam of the print medium depending upon an occurrence location of the jam of the print medium if the jam occurs from a predetermined location of a print medium feeding path, based on whether the print medium is located in the discharging direction changer, wherein the controller controls the auto-recovery operation not to be performed if the jam of the print medium occurs when the print medium is located in the discharging direction changer, or wherein the controller controls the auto-recovery operation to be performed under a predetermined condition if the jam of the print medium occurs when the print medium is not located in the discharging direction changer.

2. The image forming apparatus according to claim 1, wherein the predetermined condition comprises one of a manipulation of a user input key provided additionally and an opening or closing of the door of the housing.

3. The image forming apparatus according to claim 1, wherein the controller controls the discharging direction changer to discharge a print medium following the jammed print medium on the print medium feeding path to the medium discharger when the auto-recovery operation is performed.

4. The image forming apparatus according to claim 1, wherein the controller controls the image forming unit to form an image on a print medium following the jammed print medium after the print medium located on the print medium feeding path is discharged to the medium discharger, and controls the discharging direction changer to discharge the print medium on which the image is formed to the finisher if the jam occurs when the print medium is not located in the discharging direction changer during the process of discharging the print medium to the finisher.

5. The image forming apparatus according to claim 1, further comprising a first medium detector which is provided in a print medium discharging path within the housing, and a second medium detector which is provided in the finisher, wherein the controller determines an occurrence of the jam and an occurrence location of the jam based on an on/off of the first and second medium detectors.

6. A control method of an image forming apparatus which comprises an image forming unit forming an image on a print medium, a medium discharger discharging the print medium on which the image is formed, a finisher performing a finishing function comprising at least one of sorting, grouping, stapling, binding and punching operations with respect to the print medium on which the image is formed, and a discharging direction changer which changes a discharging direction of the print medium to guide the print medium discharged from the image forming unit to one of the medium discharger and the finisher, the control method comprising:

detecting an occurrence of a jam of a print medium in a predetermined location on a print medium feeding path; and controlling an auto-recovery operation to be performed selectively to automatically recover the jam of the print medium depending upon the occurrence location of the jam when such jam occurs, based on whether the print medium is located in the discharging direction changer, wherein the controlling comprises controlling not to perform the auto-recovery operation if the jam of the print medium occurs when the print medium is located in the discharging direction changer, or wherein the controlling comprises controlling the auto-recovery operation to be performed under a predetermined condition if the jam of the print medium occurs when the print medium is not located in the discharging direction changer.

7. The control method according to claim 6, wherein the predetermined condition comprises one of a manipulation of a user input key provided additionally and an opening or closing of the door of a housing accommodating the image forming unit therein.

8. The control method according to claim 6, wherein the controlling comprises controlling the discharging direction changer to discharge a print medium following the jammed print medium on the print medium feeding path when the auto-recovery operation is performed.

9. The control method according to claim 6, wherein the controlling comprises controlling the image forming unit to form an image on a print medium following the jammed print medium after the print medium located on the print medium feeding path is discharged to the medium discharger, and controlling the discharging direction changer to discharge the print medium, on which the image is formed, to the finisher if the jam occurs when the print medium is not located in the discharging direction changer during the process of discharging the print medium to the finisher.

10. The control method according to claim 6, wherein the controlling further comprises displaying a message through a display unit of the image forming apparatus that the auto-recovery operation may not be performed due to the jam of the print medium in the discharging direction changer.

11. The control method according to claim 6, wherein the controlling further comprises turning off a driving source of the image forming apparatus and suspending the print process until the predetermined condition is satisfied.

* * * * *